Aug. 10, 1926.
F. B. NEWELL
PRESSURE RETAINING VALVE
Filed June 29, 1920     3 Sheets-Sheet 1
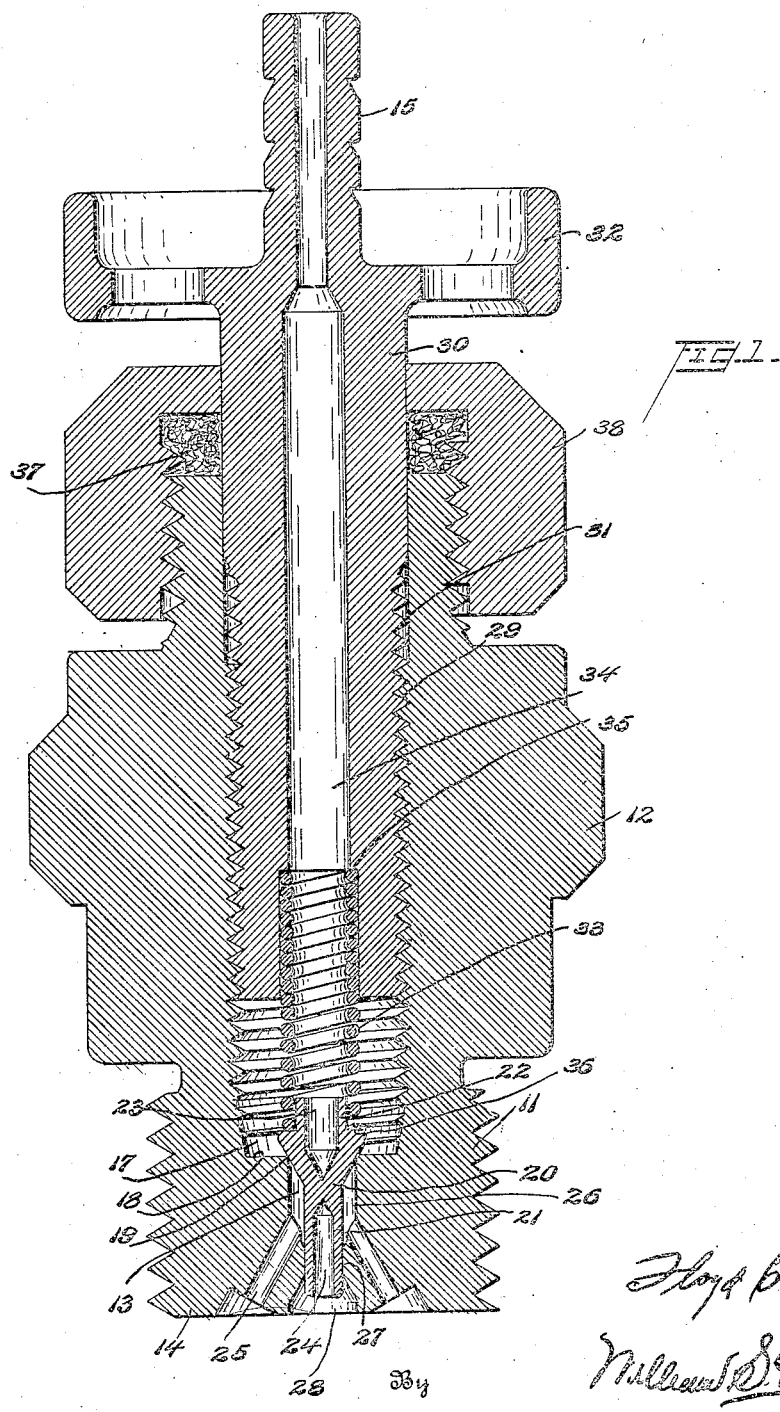

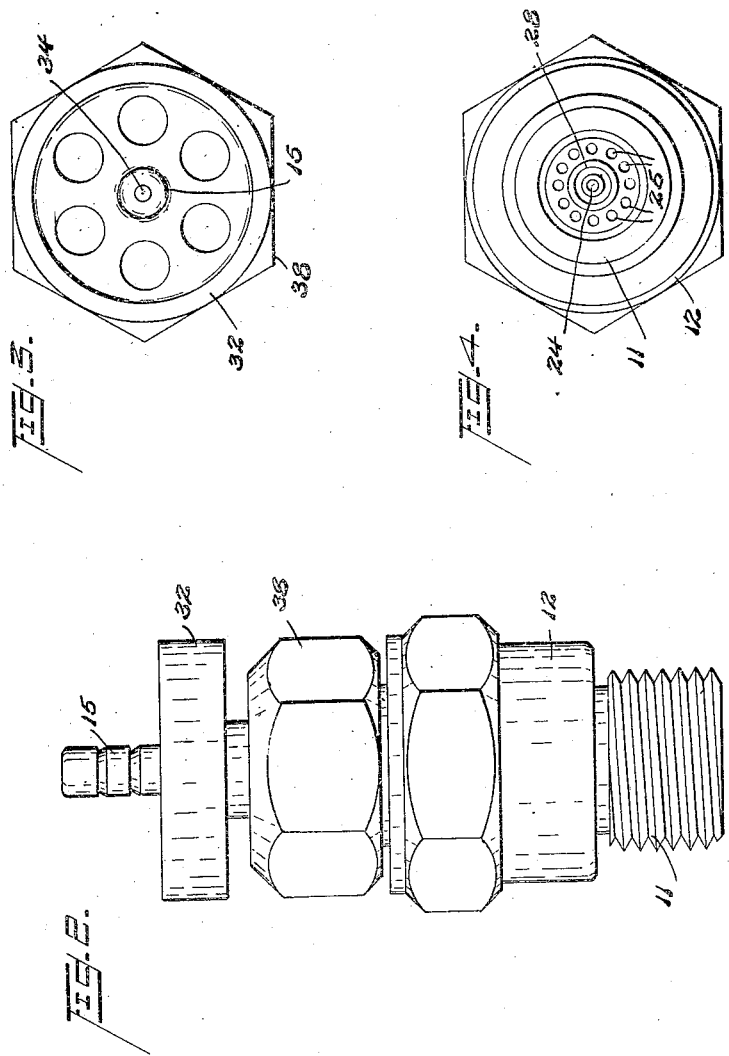

Aug. 10, 1926.

F. B. NEWELL 1,595,116

PRESSURE RETAINING VALVE

Filed June 29, 1920   3 Sheets-Sheet 3

Inventor
Lloyd B. Newell
By William S. Guest
Attorney

Patented Aug. 10, 1926.

1,595,116

UNITED STATES PATENT OFFICE.

FLOYD B. NEWELL, OF WASHINGTON, DISTRICT OF COLUMBIA, ASSIGNOR TO LEOPOLD FREEDMAN AND WILLIAM H. REYNOLDS, COPARTNERS, TRADING AS THE AMERICAN INSTRUMENT COMPANY.

PRESSURE-RETAINING VALVE.

Application filed June 29, 1920. Serial No. 392,635.

This invention is for a mechanism to be used in connection with fluids and more particularly one to be acted upon by fluid pressure for the purpose to be hereinafter more particularly set forth.

The present invention relates in general to valves and more particularly to pressure retaining valves, and has special reference to the provision of an improved form of valve device for variably discharging fluid.

Although the invention has been illustrated and described in the form of a connection between the cylinder of a high speed internal combustion engine and a gauge employed to indicate the maximum pressures occurring therein, for which purpose it has particular utility, it is obvious, however, that the invention is capable of use not only with all types of motors, but in all situations in connection with which fluid pressure is used, and is not necessarily limited in its use to ascertaining pressures.

As will be appreciated by those who are versed in such matters, the measuring of such intermittent pressure involves a number of conflicting factors, such as the requirement of extreme sensitiveness in the gauge in order accurately to measure the pressures and the violence with which they are ordinarily communicated to the gauge in structures employed for such purposes which tends to present false indices of maxima on the one hand and hunting or vibration of the indicator hand as the pressure rises and falls on the other hand.

Gauges employing my present improvement are adapted correctly to register not only maxima in engine practice but when, if, and as desired other phases of the cycle of operation.

The principal objects of my present invention are the provision of an improved pressure relief valve characterized by the provision of an adjustable admission valve; the provision generally of an improved pressure relief valve in which is provided a pressure relief valve which can be gradually withdrawn from the gradual admission of fluid pressure past the valve until any desired fluid pressure above the valve is reached, such as that of maximum fluid pressure; the provision of an improved valve in which the pressure is applied to the valve member by means wholly independent of such member for its support; the provision of an improved valve in which pressure is applied to the valve member by means which can be gradually withdrawn from its sphere of action upon such member, and more particularly by means controlled manually from the exterior of the mechanism; the provision of an improved valve in which a resilient pressure can be applied to the valve member and more particularly in which such resilient pressure can be gradually withdrawn from its sphere of action upon the valve member to a point where it has no action thereon; the provision generally of an improved spring controlled valve device, and more particularly one wherein the spring control is variable, and more particularly one wherein the spring is so disposed as to be manually varied; the provision of an improved adjustable member for varying the action of the spring and one adapted to carry the spring and maintain its relationship to the remainder of the structure; the provision of a spring operated valve wherein the weight of the spring is not carried by the valve, and wherein the spring is nested and held frictionally; the provision in a spring operated valve of an improved means for varying the tension on the spring and improved means for operating said spring tensioning means; the provision of an improved means which will act as a yielding abutment in the path of movement of the valve and which will cause the valve to be quickly and truly reseated; the provision of a spring controlled valve wherein the spring is arranged to serve both as a shock absorber and as a guide and is so disposed as to be free from distortion at all times and to equalize the pressure on various points of the valve device; the provision of an improved balanced valve device wherein the effective pressure surfaces are so equalized that there is no appreciable differential between them and one wherein the factors tending to inaccuracy in action, such as are incident to suction, friction, inertia, temperature, torque and the like are largely eliminated or fully compensated for; the provision of an improved skeletonized form of valve structure of extremely light weight and so constructed and arranged as to be accurately guided by adjacent parts; the provision of means to so control the admission of pressure fluid as to prevent any harmful effected upon or derangements of any mechanism such as a gauge to which the pressure fluid is to be fed; and the provision whereby the valve is positioned within the fluid pressure sphere in connection with which it is to be used so as to eliminate any factor which will affect the action of the fluid pressure upon the valve.

In the specific embodiment illustrated in which the invention is to be used to obtain the maximum pressures of an internal combustion engine, the device is so constructed and arranged as to require for its use no change in the engine construction either by subtraction or addition, the device in the embodiment shown being constructed and arranged to use for its co-action with the cylinder of an engine a means already thereon preferably that for securing the spark-plug in position.

Other objects and provisions will appear upon reading the appended specification in connection with the drawings in which:

Fig. 1 is a longitudinal section through the device.

Fig. 2 shows a side view and Figs. 3 and 4 are end views thereof, taken in opposite directions.

Figure 6:
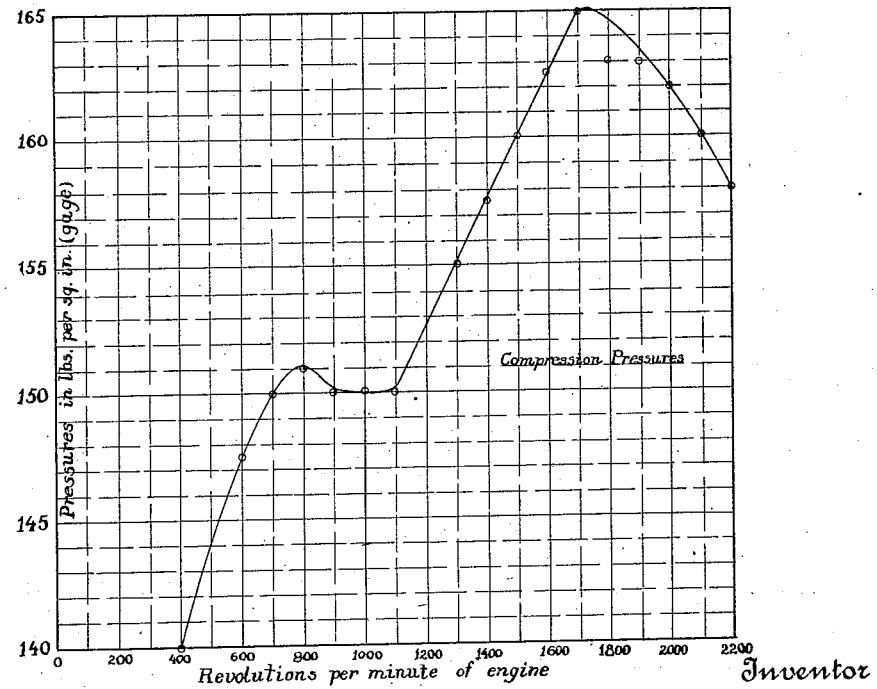

Fig. 6 shows the chart reading of the maximum pressures starting from a speed of 400 R. P. M. to 2200 R. P. M.

In the drawings, my invention is illustrated as adapted to be secured to a cylinder of an internal combustion engine, the pressure of which is to be read. The lower end 11 of the casing 12 is preferably threaded and of the shape and configuration of the lower part of a spark-plug for which a screw threaded opening is provided in the cylinder. By this arrangement, one of the spark-plugs can be removed and the casing 12 threaded in the opening thus provided therefor. The casing 12 has the passage 13 from the end 14 of the casing to the end 15 thereof, the end 15 being arranged to have one end of a re-inforced conduit forced thereon, the other end of said conduit leading to any desired type of pressure gauge. The passage 13 thus leads directly from the cylinder to the chamber in the pressure gauge.

This passage 13 is widened as shown at 17, thus providing the right angled shoulder 18 and the knife edge 19. This edge 19 forms a seat for the valve 20 which is shown as frusto-conical in shape. By providing this knife edge contact between the valve 20 and its seat 19, the difference in the effective areas of the upper and lower surfaces is reduced to a minimum, and in fact almost wholly eliminated. Furthermore such features as friction, adhesion, suction and so forth are substantially eliminated as factors in the valve movement. Extending from the valve 20 in both directions are the guiding projections 21 and 22 to be more fully described shortly. To further reduce the valve as a factor in its movement, it is skeletonized as shown at 23 and 24, thus materially reducing its weight. A valve construction is thus produced which is not only extremely sensitive to differences in pressure, but one in which the external factors are reduced to a minimum.

The fluid under pressure is admitted from the cylinder into the casing below the valve 20 by a circular row of passages 25 each in open communication with the cylinder, and arranged obliquely and communicating with the reduced portion 26 of the passage below the valve seat 19. The lower surface of the casing 12 is reamed out circularly and angularly, the passages 25 leading into this reamed out portion at their lower ends. The lower guide member 21 is guided in its movement by the cylinder wall 27, this wall being open to the cylinder through the enlarged port 28. By this arrangement the area of the lower face of the valve open to action by the fluid pressure is in nowise reduced. Furthermore by the construction thus far described the valve 20 is positioned within the cylinder and is subject to the direct and immediate action of the pressure fluid.

The enlarged part 17 of the passage 13 is threaded interiorly as shown at 29, and receives within it the member 30 externally threaded at 31. Carried by the member 30 at its upper end is the hand wheel 32. When this hand wheel is turned, the member 30 is moved either up or down, carrying with it the spiral spring 33 carried in any desired manner by the member 30, in the lower enlarged part of the passage 34, the upper end of the spring abutting against the shoulder 35 formed at the point of enlargement and which acts as a stop to prevent the spring being forced upwardly in the member 30. It will thus be seen that by rotating the hand wheel 32 in one direction the spring 33 is moved bodily away from the valve 20, and the length of the screw threaded engagement is such as to permit the spring to be moved wholly out of contact with and considerably beyond the valve 20. When the hand wheel is moved into the direction of and into contact with the valve the continued rotation of the hand wheel will cause the spring 33 to act evenly on the valve. The lower end of the spring is squared off as shown at 36. The spring fits very tightly and frictionally in the adjusting screw and when the screw is turned it does not twist in the screw but the squared lower end turns around on the valve or, if the pressure and friction between the two is great enough, it turns the valve with it.

The spring 33 is centrally positioned in the casing 12 and has its inside diameter of such size as to loosely receive within it, the upper valve guide 22, the spring 33 and the guide 22 on the other hand acting to prevent the spring being twisted or distorted to the side. The spring 33 serves the additional function of acting as a buffer to cause the valve member to rebound quickly to its seat, this action being assisted by the guiding co-action of the guide member and the inner surface of the spring.

To eliminate the possibility of leakage of pressure between the co-acting threaded portions 29 and 31, the packing 37 and the screw threaded cap member 38 are provided.

In the practical use of my device, to obtain the maximum pressures of the cylinder of an internal combustion engine, a spark plug is removed and the casing 12 threaded into the spark plug opening of the cylinder, the member 30 being threaded down for practical purposes to apply only a moderate pressure to the valve although any desired pressure may be applied.

Where it is desired to test an engine without explosions, the engine is turned over by some outside power at a fixed R. P. M., 400 R. P. M. for example. The gauge will show a reading depending upon the engine compression and the spring pressure upon the valve. As the member 30 is gradually threaded upwardly, the pressure of the spring 33 on the valve will gradually decrease and the gauge reading will show a gradual increase until the spring 33 is moved wholly out of contact with the valve 20 when the maximum pressure will be shown on the gauge. An important factor in the accuracy of the gauge readings is the co-action of the guide 22 and the spring 30 and the compression above the valve to cause the valve 20 to quickly reseat itself. This arrangement eliminates the possibility of the full pressure being admitted suddenly and at once into the gauge member with the consequent permanent derangement thereof and inaccurate readings.

Figure 5:
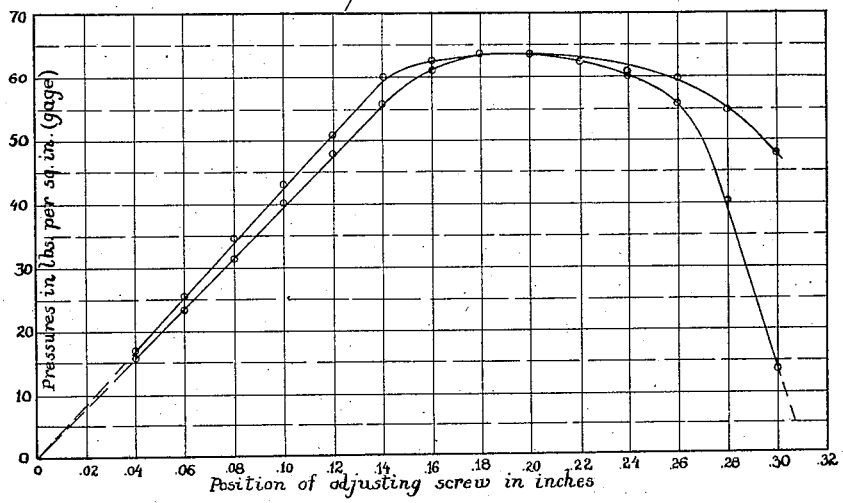
Fig. 5 is a chart of the gauge readings obtained with the use of my device.

Fig. 5 is a characteristic chart on which is plotted the pressure curve obtained as the hand wheel is rotated to move the spring from off the valve, the maximum being maintained for a considerable movement of the spring away from the valve. The double curve shown in Fig. 5 represents the vibrations of the needle of the gauge. As shown on the right side of this chart, the needle vibrates through the whole range if the handwheel 32 is moved for a considerable distance after the maximum is reached, thus showing that the valve does not reseat itself properly due to the inefficient co-action of the spring 30, valve 20 and guide 22.

Fig. 6 is a chart in which has been plotted a curve showing maximum pressures for a cylinder at gradually increasing speeds from 400 R. P. M. to 2200 R. P. M.

Having thus described my invention and illustrated its use what I claim as new and desire to secure by Letters Patent is:

1. In a device of the character described in combination, a valve casing having a passage adapted to be connected to a source of fluid under pressure, a valve and a seat therefor in said passage and resilient means mounted for bodily movement to a position into and out of contact with the valve for applying yielding pressure thereto.

2. In a device of the character described in combination, means for controlling a fluid flow from a source of pressure to a gauge, including a casing having a valve therein and resilient means operable from the exterior of the casing for bodily movement to a position into and out of contact with the valve for applying a variable pressure to said valve.

3. In a device of the character described in combination, a valve casing having a passage adapted to be connected to a source of fluid under pressure, a valve and a seat therefor in said passage, and resilient means operable from the exterior of the casing for bodily movement to a position into and out of contact with the valve for variably applying a pressure to said valve from maximum to zero.

4. In a device of the character described in combination, means for controlling a fluid flow from a source of pressure to a gauge, said means including a casing having a passage therein, a valve and seat therefor in said passage, and resilient means operable from the exterior of the casing for bodily movement to a position into and out of contact with the valve whereby said valve can be caused to admit the pressure from said source past said valve gradually at gradually increasing pressure.

5. The process of determining the maximum compression of a fluid in a chamber by means including a valve, including the step of applying pressure to the valve gradually decreasing in amount until zero pressure is reached.

6. The process of determining the maximum compression of a fluid in a chamber by means including a valve, including the step of applying a gradually decreasing pressure to the valve, whereby the fluid pressure will be admitted gradually past the valve, without any consequent derangement of the mechanism due to a sudden introduction of a high pressure.

This specification signed this 28th day of June, 1920.

FLOYD B. NEWELL.